Dec. 29, 1953 S. ROBERTS 2,664,502

ULTRAHIGH-FREQUENCY MIXER

Filed June 23, 1945

INVENTOR
SHEPARD ROBERTS
BY Ralph L. Chappell
ATTORNEY

Patented Dec. 29, 1953 2,664,502

UNITED STATES PATENT OFFICE 2,664,502

ULTRAHIGH-FREQUENCY MIXER

Shepard Roberts, Cambridge, Mass.

Application June 23, 1945, Serial No. 601,160

5 Claims. (Cl. 250—20)

Figures 1, 2:
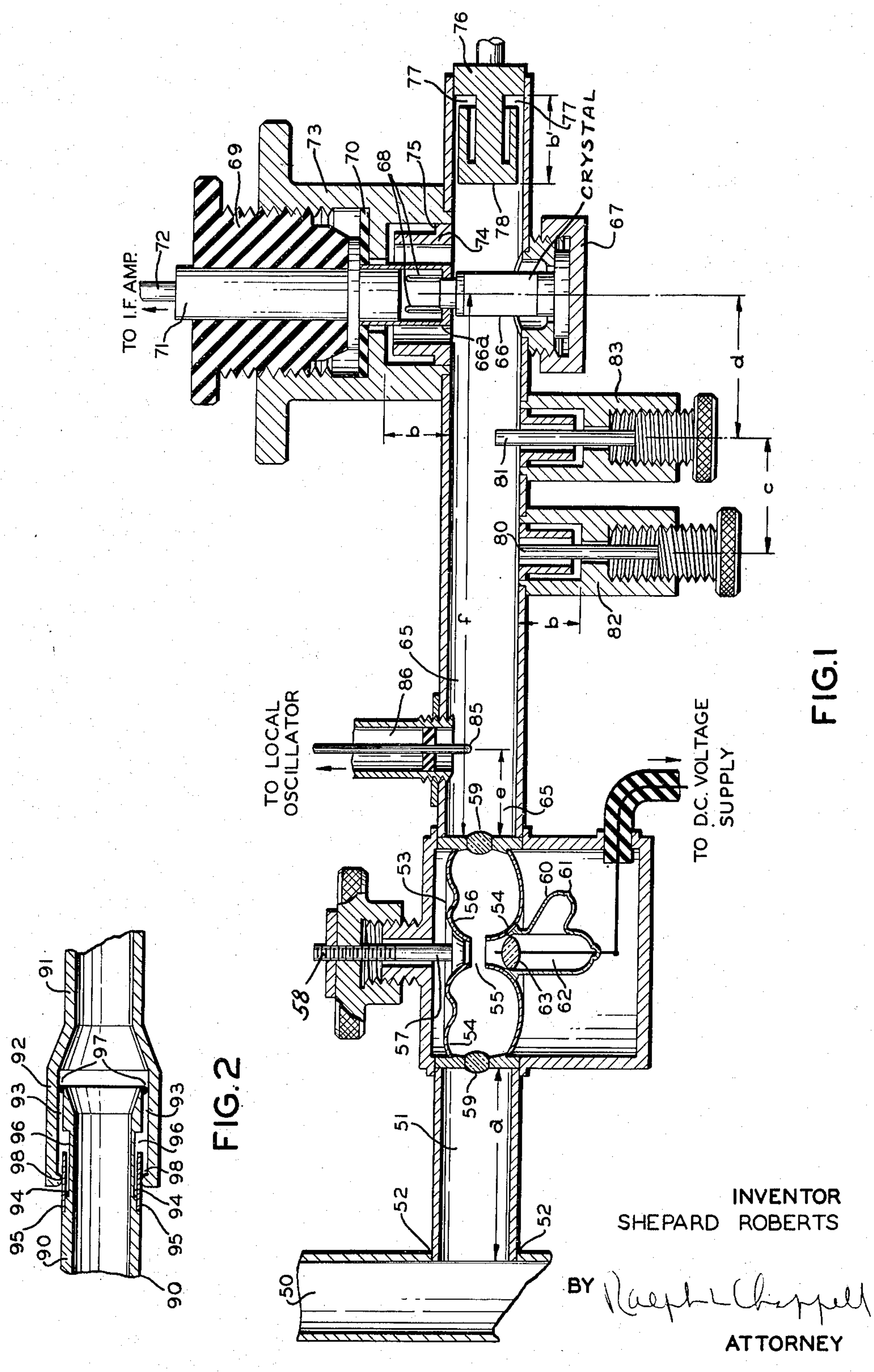

This invention relates to ultrahigh frequency mixers, particularly those which operate directly in a wave guide and which may be tuned to match the impedance of the connecting guide at the operating frequency.

It is an object of this invention to provide a mixer which operates directly in a wave guide.

It is a further object of this invention to provide a mixer which may be tuned to match the impedance of the connecting wave guide at the operating frequency.

It is a further object of this invention to provide a mixer which mixes two extremely high frequencies to produce a relatively low intermediate frequency which may be easily amplified.

It is a further object of this invention to provide a mixer which uses a crystal with the accompanying reduction in noise level.

It is a further object of this invention to provide a mixer whose crystal may be easily exchanged with another.

It is a further object of the invention to provide a mixer utilizing a crystal inserted in a wave guide which crystal is directly connected to an intermediate frequency amplifier.

Other and further objects will appear during the course of the following description.

Broadly, the invention embraces a crystal of the cartridge type positioned transverse to a wave guide in the plane of the electric field. One end of the crystal cartridge is connected directly to the adjacent wall of the guide. The other end is connected to the adjacent wall opposite to first mentioned wall through a circuit effectively series resonant at the frequencies of the local oscillator and signal. This circuit permits passage of the signal and local oscillator currents, but will not permit passage of the intermediate frequency current. A direct connection is provided for this intermediate frequency at the end of the crystal associated with the resonant circuit to the input of the intermediate frequency amplifier.

A movable plunger is provided in the wave guide which in cooperation with two screws movable in the electric plane of the guide match the portion of the guide associated with the crystal cartridge of the remaining connecting portion of the guide.

The invention will now be described in detail with reference to the accompanying drawings, in which:

Fig. 1 is a generally sectional elevational view of the mixer and associated radio frequency circuit; and Fig. 2 is a sectional elevational view of a joint for adjusting the length of the wave guide in Fig. 1.

In Fig. 1 is shown an arrangement of apparatus for carrying out the present invention which is particularly adapted for transmitting and receiving systems in which hollow pipe wave guides are used for the transfer of oscillatory energy from one part of the system to another. Such an arrangement is consequently of particular utility at the shorter wave lengths and in apparatus where high transmitter power is employed. The hollow pipe wave guide leading from the transmitter to the antenna system is shown at 50. This and the other wave guides of the system are usually provided in rectangular form, although cylindrical wave guides could also be used, because the rectangular form of wave guide gives good control over the polarization of the transmitted waves. A branch wave guide 51 forms a junction with the wave guide 50 at 52. The various wave guides in Fig. 1 are shown in a section parallel to the direction of the electric vector, which is to say, in accordance with wave guide design practice, they are shown in a longitudinal section parallel to the shorter wall of the wave guide. The junction 52 is therefore one of the type known as an "electric plane" junction. It is to be understood that a "magnetic plane" junction could also be used, in which case the axis of the wave guide 50 would have a direction perpendicular to the plane of Fig. 1 and the junction 52 would open into a narrower wall of the wave guide 50 instead of into one of its broader walls.

The wave guide 51 leads to an automatic electric breakdown discharge device 53 provided with a resonator 54 having a discharge gap 55. The resonator 54 is provided with a flexible wall 56 which permits adjustment of the dimensions of the gap 55 and consequently of the resonant frequency of the device by means of a rod 57 and a screw thread adjustment 58. Coupling between the input and output wave guide and the resonator 54 is provided simply by holes in the resonator walls which close off the respective wave guides, which coupling holes are provided with sealed-in glass windows 59 for the purpose of maintaining a partial vacuum in the resonator 54. The partial vacuum is originally established through an exhaust tube 60, which is sealed off, as at 61, after the evacuation. The exhaust tube also serves for the support of a "keep alive" electrode 62. A small glass bead 63 is mounted on the electrode 62 to prevent accidental short-circuiting of the electrode voltage and to assist in centering the electrode in the structure.

In order to reduce dissipation of transmitter power of the gap 55 the length of wave guide 51 should be properly adjusted. The length of the wave guide 51 indicated by the dimension *a* should closely approximate an even number of half-wave lengths for best results, with a small adjustment (usually shortening the length slightly from that just prescribed) on account of the loading effect of the coupling aperture between the wave guide 51 and the resonator 54. It will be noted that the proper length of a hollow pipe wave guide between a wave guide junction and an electrical breakdown switch differs from the desirable length between a coaxial conductor line junction and an automatic electrical breakdown switch.

The resonator 54 is coupled through the other of the windows 59 to a wave guide 65 leading towards the receiver input. In the apparatus of Fig. 1 the function of a resonator apparatus is performed by the end portion of the wave guide 65 in the neighborhood of the crystal 66, which portion is caused to act as a resonant section of wave guide, the characteristic impedance of the non-resonant part of the wave guide 65 being matched to the resonant section of wave guide which includes the crystal, by means of a suitably located loading capacitance as hereinafter described. Such apparatus may be said to function as a resonant transformer between the crystal and a non-resonant transmission means. This view is only accurately descriptive when the impedances of the system are fairly well matched by the arrangement, for otherwise the transmission means connected to the "transformer" will have standing waves and will not act as a non-resonant line.

The crystal 66 which operates as a first or heterodyne detector is located between a clip 66a and an adjustable screw-capped recess 67, thus being essentially across the wave guide 65. The crystal is shown in the form of a cartridge of the type commonly used for mounting microwave detector crystals, which contains the usual silicon crystal, "cat's whisker" wire and electrical connections, the structure being sealed in wax and enclosed in an insulating structure having terminal contact caps. This form of structure is adapted to preserve the crystal contact adjustment against disturbance from shock. The clip 66a is hollow in order to receive the crystal and is provided with slots such as those shown at 68 in order to provide spring action for better contact with the crystal. The clip 66a is insulated from the wave guide structure by a large insulating plug 69 and a thin insulating washer 70. A direct connection is made from the clip 66a to the ungrounded side of the input of the intermediate frequency amplifier of the receiver (not shown), the electrical connection being effected by means of the rod 71 and the wire 72. Although for purposes of clearer illustration the washer 70 appears on the drawing as having a substantial thickness, in fact this washer in practice is extremely thin and may for instance be made by stamping out of polystyrene tape of a thickness of only five thousandths (.005) of an inch.

The close approach of the structure 71 to the structure across the thin polystyrene washer 70 provides a by-pass condenser across the intermediate frequency amplifier input which by its filtering action tends to prevent any signal or local oscillator frequency currents which may reach the neighborhood of the washer 70 from going on toward the intermediate frequency circuits. The by-pass capacitance so provided is too small to have any appreciable effect upon the intermediate frequency output of the mixer stage.

Although the by-pass capacitance just described can serve to filter the intermediate frequency output of the mixer it is too far from the crystal to provide the short and direct signal frequency connection desired between the end of the crystal cartridge engaged in the clip 66a and the wave guide wall. The latter effect is obtained by surrounding the clip 66a by a resonator such that a short circuit for such frequency appears by "reflection" at the crystal end of the clip, which is to say that the resonator presents an extremely low impedance between the clip and the wave guide wall for its resonant frequency. Such a resonator may be designated as by "by-pass resonator." The special form of resonator used for radio frequency by-passing is formed by providing a circumferential space about the clip 66a and dividing that space by a flanged cylinder 74, the flanged end of which forms part of the wave guide wall 65 and is in good electrical contact with the structure 73. As shown on Fig. 1 this results in providing a cylindrical space which at a certain distance from the point where it opens up into the wave guide is folded back on itself and terminates in a closed end at 75. The point where this space or cavity is folded back on itself is made to approximate very closely a quarter-wave length of the oscillations of microwave frequency upon which the device is to operate, which is to say that the dimensions shown at $b$ on Fig. 1 should approximate a quarter-wave length of such oscillations. The closed end of the cavity at 75 will then "appear" at the mouth of the cavities which surround the extremity of the clip 66a as a very low impedance, practically a short circuit, since the mouth is spaced electrically a half-wave length away from the closed end 75. In addition the configuration of this by-pass resonator is such that the nature of the electrical insulation between the rod 71 and the structure 73 at points beyond the folded end of the resonator becomes quite immaterial to the radio frequency operation of the crystal circuit. As a result of the operation of the by-pass resonator the crystal is effectively, for the microwave frequencies in question, connected directly across the wave guide 65.

The end of the wave guide 65 beyond the crystal location is closed off by a conducting plug or plunger 76. This plunger 76 is provided on its upper and lower faces with by-pass resonators such as those described in connection with the clip 66a. Since the configuration of the wave guide is, as is the usual case, rectangular, and since the by-pass resonators are in such a case useful only between the plunger and the broader sides of the wave guide (the electric vector being perpendicular to the broader side), the by-pass resonators are rectangular in configuration in the case of the plunger 76 instead of cylindrical as shown in connection with the clip 66a and the structure 73. The by-pass resonators are shown in the plunger 76 at 77. As in the case of the by-pass resonator in the structure 73 surrounding the clip 66, the dimension marked $b'$ on Fig. 1 should closely approximate one quarter of the wave length of the oscillations in question. When constructed as described the plunger 76 acts to close off the wave guide 65 at the plane of its front surface 78 with the practical effect of a perfectly conducting terminating wall, irrespective of the quality of the contact between the plunger 76 and the wave guide 65 rearwardly of the by-pass resonator 77.

Motion of the plunger 76 in or out of the wave guide 65 will change the pattern of the standing waves produced as a result of reflection of oscillations from the termination of the wave guide at the surface 78, so that by adjustment of the position of the plunger 76 the impedance of the oscillating system at the point where the crystal is connected across it may be made to match the impedance of the crystal or to correspond to some slightly higher value, providing a factor of safety against overload.

In order that the resonant end portion of the wave guide 65 which includes the crystal and its associated structure may be coupled to the signal input for maximum energy transfer of the received signal during periods when the transmitter is not operating, which requirement usually corresponds to the requirement that there shall be no standing waves in the portion of the wave guide 65 immediately adjacent to the electrical discharge device 53, two adjustable capacitance loading devices 80 and 81 are provided in the wave guide 65 at particular locations between the crystal position and the electrical discharge device 53. The loading devices comprise rods movable in and out of the guide and extending through the middle portion of the wave guide wall and parallel to the electric vector. Variable inductances may be provided in a similar fashion by orienting rods 80 and 81 perpendicularly to the electric vector. The rods when providing variable inductance, in the case of rectangular guides, would then usually be introduced through one of the narrower walls. Because crystals usually differ quite widely from each other in radio frequency impedance, a sufficiently wide range matching adjustment for practical use cannot be made with a single adjustable capacitance at a fixed location. A single adjustable matching capacitance such as the structure 81, 83 could be mounted in a fashion permitting it to be slid longitudinally along the wave guide 65, which could be suitably slotted for the purpose. I prefer, however, to provide two adjustable matching capacitances, separated by a distance equal to a quarter wave length of the oscillations in the guide (as indicated by the dimension *c* on Fig. 1), so that if a suitable match cannot be obtained with any adjustment of one of the capacitances, it is practically certain to be obtainable with some adjustment of the other adjustable capacitance. One of the adjustable capacitances is thus preferably kept flush with the wave guide as shown by the position of the capacitance screw 80.

The capacitances loads 80 and 81 are essentially screws protruding into the wave guide 65 at suitably selected points. The structures 82 and 83 in which the screws 80 and 81 are respectively threaded and which are in electrical contact with the wall of the wave guide 65 are provided with by-pass resonators similar to those previously described in connection with the structure 73 and in connection with the plunger 76, which here serves the function of establishing an effective radio frequency connection directly between the screws 80 and 81 and the immediately adjacent portion of the wall of the wave guide 65. Thus a good radio frequency electrical contact is maintained at the desired point between the capacitance load and the wave guide wall, irrespective of the quality of electrical contact occurring at the screw threads associated with the capacitance loading devices. This is a great advantage since the electrical contacts at such screw threads are often uncertain and sparking might otherwise occur. The by-pass resonators in this case have a cylindrical configuration, similar to that of the by-pass resonator associated with the structure 73 surrounding the crystal clip 66*a*. As before, the dimension of these resonators marked on Fig. 1 as *b* should closely approximate one quarter of the wave length of the oscillations in question.

The distance between the axis of the crystal 66 and the nearer matching screw 81, shown on Fig. 1 by the dimension *d*, is not critical within wide limits, since variations therein can usually be compensated by adjustment of the particular matching screw which is used. Distances less than one-half wave length are to be preferred in order to minimize frequency sensitivity. It is to be noted that the continuation of the wave guide 65 beyond the crystal 66 and the adjustable termination 78 in effect constitute a variable admittance across the wave guide 65 at the crystal position. The tuning screws 80 and 81 likewise constitute variable admittances across the wave guide 65. The adjustment of the terminating wall 78 and of one of the screws 80, 81 may be performed in accordance with the practice relating to "double stub" tuners for the purpose of matching the impedance of the crystal to the characteristic impedance of the wave guide 65. Also in accordance with the practice in connection with double stub tuners, a spacing between the variable admittances of approximately three-eighths wave length is preferred, so that the distance *d* indicated on Fig. 1 between the crystal axis and the axis of the tuning screw 81 is preferably made approximately three-eighths or one-third wave length. This dimension may be varied rather widely, however, the only limitation being that a spacing between the crystal axis and one of the tuning screws equal to a half wave length would make the tuning screw in question useless, since a double stub tuner with one-half wave spacing between stubs would require stubs capable of adding infinite susceptance in order to fulfill its purpose, a condition which cannot generally be met in practice.

The matching arrangement comprising the adjustable closure 78 and the adjustable capacitive loads 80 and 81 is somewhat different from the conventional double stub tuner to which an analogy has just been drawn for the purpose of illustration and explanation, one of the tuning stubs being replaced in this case by two tuning elements, the screws 80 and 81. It is desirable to provide two matching screws 80 and 81 as shown because the variable admittance provided by a capacitive load has a range corresponding only to a 90° variation in the electrical length of a tuning stub of a double stub tuner. In order that the other 90° variation may be provided in order to complete the 180° of variation necessary for full control over the matching of reactances it is desirable to provide a second capacitive load a quarter-wave length distant from the first capacitive load. Ordinarily the matching adjustment is made by adjusting the plunger 76 and one of the screws 80, 81, the other screw being left in a retracted position such as that of the screw 80 in Fig. 1.

In order that the crystal may function as a heterodyne detector or mixer it is necessary to feed to the crystal a locally generated oscillation as well as the signal picked up by the antenna system. In the apparatus of Fig. 1 the local oscillator output is coupled to the wave guide 65 by extending the central conductor 85 of the coaxial output line 86 of the local oscillator so that the conductor 85 protrudes into the wave guide 65 and is thereby adapted to excite oscillations in the wave guide 65 which will be transmitted along the wave guide to the crystal. In order to mitigate transfer of energy from the local oscillator to the resonator 54 and then to the antenna system and out into space, the location of the central conductor 85 where it protrudes into the wave guide 65 is so arranged that the distance between it and the apparatus 53 which distance is shown on Fig. 1 by dimension e, is approximately an odd number of quarter-wave lengths of the oscillations in question, thus mismatching the oscillator output for transfer of energy toward the antenna and mitigating undesired radiation.

For the application of the present invention to the arrangement of apparatus shown in Fig. 1 the apparatus should be so constituted that the distance between the crystal and the output side of the apparatus 53, which distance is shown on Fig. 1 by the dimension f, will approximate an odd number of quarter-wave lengths of the oscillations in question, subject to allowances for terminal effects discussed below. In the apparatus of Fig. 1 no arrangement is shown for adjusting the dimension f and it is expected that the frequency of operation will be sufficiently well known in advance of manufacture that the proper dimension f can be incorporated into the design of the apparatus. If the frequency of operation is not known to a sufficient degree of accuracy for the obtaining of a dimension f suitable to achieve the advantages of this invention in the fullest degree, mechanical arrangements could be provided in the portion of the wave guide 65 adjacent to the apparatus 53 for varying the wave guide length. Such an arrangement could be a sliding joint, preferably one provided with a by-pass resonator as shown in Fig. 2 and hereinafter described, which would eliminate the necessity for extremely good electrical contacts. The exact magnitude of the dimension f is subject to a slight correction which in the case of the apparatus of Fig. 1 would be a slight decrease in the length f, on account of the loading effect of the coupling aperture between the wave guide 65 and the resonator 54. This correction is relatively slight and it may be estimated by known methods either through calculation or experimental determination. A more important factor modifying the actual dimension f used in practice lies in the fact that the crystal cartridge 66 has an appreciable electrical length, which should be taken into account in any calculation of the dimension f. The calculation of these terminal effects can be avoided if the dimension f is determined by direct experiment, such as by measurement of the standing waves in the wave guide 65 for different amounts of crystal current.

It is to be noted that the dimensions which have heretofore been described in terms of wave lengths are not to be referred to the free space wave lengths of the oscillations in question, but rather to the wave lengths of the oscillations in the structure in question. Where the structure in question is a wave guide of known cross section, the wave length of the oscillations within the wave guide may readily be calculated by known formulae and of course it may also be experimentally determined. The wave length in two conductor lines is affected by such factors as the number and kind of spacing insulators. Formulae for the wave length in various types of line are well known. The wave length to which the dimension shown on Fig. 1 as small b refers is related to a somewhat more complicated structure, namely, the bypass resonators above described. These resonators operate in the "coaxial" mode and the wave length is substantially the free space wave length, it being desirable, however, to make a small allowance for the "end effect" at the mouth of the resonator in calculating the length of the resonator. The bypass resonators 77 operate in the rectangular wave guide mode and the electrical quarter-wave length dimension b′ should consequently be physically somewhat longer than the electrical quarter-wave length dimension b, being almost one quarter of the wave length in the guide 65 (but not quite that great, because of the lesser width of the resonators 77).

As shown in Fig. 1, the spacing of the electrical line length according to this invention between the protective breakdown switch and the receiver input may be provided for in the design of the apparatus when the apparatus is intended to be used at a single frequency, without incorporating means for adjusting the said spacing. If it is desired to incorporate into apparatus of the general configuration shown in Fig. 1 some means for adjusting the said spacing in accordance with changes in operating frequency, this may be done by providing a sliding joint in the pipe wave guide 65, as above suggested. A preferred type of sliding joint for the provision of such an adjustment is illustrated in Fig. 2.

In Fig. 2 the two portions of rectangular pipe wave guide between which the sliding joint is arranged are shown at 90 and 91 in a cross section parallel to the electric vector of the oscillations intended to be transmitted. The pipe 91 is provided with a widened extremity 92 adapted to fit over the pipe 90 leaving a small clearance 93 between the upper and between the lower walls. Shallow cavities 94 are formed in the upper and lower sides of the pipe 90 (i. e. its broader sides) which are covered by conducting partitions 95 except for a narrow slot 96 along the forward end of each cavity 94, where the said cavities communicate with the clearance space 93. The center lines of slots 96 are spaced an electrical quarter-wave length from both the end of the pipe 90 and from the rear wall of the associated cavity 94. Such electrical quarter-wave length corresponds approximately to the dimension b′ on Fig. 1.

The cavities 94 are closed off at the sides by the lateral walls of the pipe 90 which also provides support for the cover plates 95. The plates 95 are preferably soldered onto the pipe wave guide 90. Beads 97 and 98 are provided on the wave guide extremities to maintain the clearance 93 between the upper walls and between the lower walls of the wave guide pipes and to assure the absence of electrical contact at points located between the slots 96 and the immediate neighborhood of the end of the wave guide 90. The beads 97 need not be continuous ridges and may be replaced by simple guide studs near the corners of the wave guides or at intervals across the wave guide walls along a line perpendicular to the wave guide axis.

The cavities 94 cooperate with the clearance space 93 to constitute by-pass resonators and to produce the equivalent of a very good electrical contact between the end of the pipe 90 and the wall of the pipe 91 for electric oscillations of frequencies approximately equal to the frequency of operation.

Although I have shown and described only a certain specific embodiment of the invention, I am fully aware of the many modifications possible thereof. While there has been described what is at present considered the preferred embodiment of the invention, it will be obvious to those skilled in the art that various changes and modifications may be made therein that fall within the scope of the appended claims.

I claim:

1. A mixer adapted to use a crystal cartridge, comprising a wave guide having diametrically opposed openings in its walls, a hollow structure extending through one of said openings and projecting outwardly from said guide, a rod projecting through said hollow structure having a clip adjacent the guide for holding one end of said crystal cartridge, a screw cap covering the other of said openings, and adapted to connect the other end of said crystal cartridge to the adjacent wall of said wave guide, adjacent abutments on the inside of said hollow structure and on said rod, a layer of polystyrene tape separating said abutments to form a by-pass condenser therebetween, a plug threadably connected to the inner wall of said hollow structure pressing against the abutment on said rod and insulated therefrom to secure said rod in said hollow structure, a cylindrical sleeve positioned between said clip and said hollow structure and spaced from both, a flange on one end of said sleeve and connecting said sleeve to said hollow structure adjacent the wall of said guide, said sleeve being in length substantially one quarter the wave length of the energy to be mixed and thereby effectively providing a short circuit between said clip and the adjacent wave guide wall for said energy.

2. In combination, a wave guide, means for providing reactance in parallel with said guide comprising, a rod extending into said guide through a circular opening in a side wall of said guide, said opening being of a diameter substantially larger than that of said rod, a cylindrical hollow structure attached to said guide and concentric with said opening in said guide, a cylindrical sleeve disposed concentrically between said rod and said hollow structure and spaced from both, a flange on one end of said sleeve and electrically connecting said sleeve to said hollow structure adjacent to the wall of said guide, the inner diameter of said cylindrical hollow structure being greater than the outer diameter of said sleeve, said sleeve being in length substantially one quarter the wave length of the energy being transferred in said guide and thereby effectively providing a short circuit at said opening in said guide for said energy.

3. In combination, a wave guide, means for providing reactance in parallel with said guide comprising, a plurality of rods extending into said guide through circular openings in a side wall of said guide, said rods being spaced longitudinally of said guide an odd number of quarter wave lengths, said circular openings being of diameters substantially larger than the diameters of said rods, a plurality of cylindrical hollow structures attached to said guide and concentric with said openings in said guide, cylindrical sleeves disposed concentrically between said rods and said hollow structures and spaced from said rods and said hollow structures, flanges on one end of each of said sleeves and connecting said sleeves to said hollow structures adjacent to said side wall of said guide, the inner diameters of said cylindrical hollow structures being greater than the outer diameter of said sleeves, said sleeves being in length substantially one quarter the wave length of the energy being transferred in said guide and thereby effectively providing short circuits at said openings in said guide for said energy.

4. A mixer adapted to use a crystal cartridge comprising, a wave guide having diametrically opposed openings formed in the walls thereof, a hollow structure attached to said wave guide at one of said openings and projecting outwardly from said guide, means within said hollow structure for retaining one end of said crystal cartridge, a rod connected to said means and extending outwardly beyond said hollow structure, a cap for covering the other of said openings and adapted to connect the other end of said crystal cartridge to said wave guide at the adjacent wall thereof, a flange on said rod, a stepped section within said hollow structure of diameter smaller than that of said hollow structure and that of said flange, a layer of dielectric material separating said flange and said stepped section to form a bypass condenser therebetween, means for retaining said flange in close contact with said dielectric layer and said layer in close contact with said stepped section, and means at the junction of said wave guide and said hollow structure for providing an effective short circuit at said junction to energy being transferred in said wave guide.

5. A mixer adapted to use a crystal cartridge comprising, a wave guide having diametrically opposed openings formed in the walls thereof, a coaxial output line attached to said wave guide at one of said openings and projecting outwardly from said guide, a conductive cap for covering the other of said openings and adapted to connect one end of said crystal cartridge directly to the wall of said wave guide adjacent the other of said openings, an inner conductor within and forming a part of said coaxial output line having a flange formed thereon, means for retaining the other end of said crystal attached to said inner conductor adjacent said one of said openings, an outer conductor forming the external surface of said coaxial output line and having a section of reduced diameter adjacent said flange, a layer of dielectric material between said flange and said section of reduced diameter forming a condenser therebetween and means at said one of said openings in said wave guide for presenting an effective short circuit to energy being transferred within said wave guide.

SHEPARD ROBERTS.

References Cited in the file of this patent

UNITED STATES PATENTS

| Number | Name | Date |
|---|---|---|
| 1,537,856 | Michels | May 12, 1925 |
| 2,236,004 | MacLean | Mar. 25, 1941 |
| 2,239,905 | Trevor | Apr. 29, 1941 |
| 2,253,589 | Southworth | Aug. 26, 1941 |
| 2,257,783 | Bowen | Oct. 7, 1941 |
| 2,332,952 | Tischer | Oct. 26, 1943 |
| 2,378,944 | Ohl | June 26, 1945 |
| 2,408,420 | Ginzton | Oct. 1, 1946 |
| 2,413,186 | La Rue | Dec. 24, 1946 |
| 2,418,518 | McArthur | Apr. 8, 1947 |
| 2,424,002 | Sloan | July 15, 1947 |
| 2,427,087 | Carlson | Sept. 9, 1947 |
| 2,427,107 | Landon | Sept. 9, 1947 |
| 2,436,830 | Sharpless | Mar. 2, 1948 |
| 2,460,109 | Southworth | Jan. 25, 1949 |
| 2,469,222 | Atwood | May 3, 1949 |
| 2,514,678 | Southworth | July 11, 1950 |

FOREIGN PATENTS

| Number | Country | Date |
|---|---|---|
| 116,110 | Australia | Nov. 4, 1942 |